United States Patent
Kurupati

(10) Patent No.: US 7,161,908 B2
(45) Date of Patent: Jan. 9, 2007

(54) DETERMINISTIC BANDWIDTH THROTTLING TO FACILITATE OPERATION OF A CONTROL UNIT

(75) Inventor: Sreenath Kurupati, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1078 days.

(21) Appl. No.: 10/256,475

(22) Filed: Sep. 27, 2002

(65) Prior Publication Data

US 2004/0062253 A1 Apr. 1, 2004

(51) Int. Cl.
*H04J 1/16* (2006.01)

(52) U.S. Cl. .................... 370/235; 370/395.4

(58) Field of Classification Search ............... 370/229, 370/231, 232, 235, 376, 458, 395.4, 401–402, 370/443, 506, 508
See application file for complete search history.

(56) References Cited

U.S. PATENT DOCUMENTS 5,297,139 A * 3/1994 Okura et al. ............... 370/428
6,744,778 B1 * 6/2004 Allpress et al. ............ 370/442

* cited by examiner

*Primary Examiner*—Brenda Pham
(74) *Attorney, Agent, or Firm*—Buckley, Maschoff & Talwalker LLC

(57) ABSTRACT

According to some embodiments, spare processing cycles are inserted into a stream of information packets to facilitate operation of a control unit.

12 Claims, 6 Drawing Sheets

DETERMINISTIC BANDWIDTH THROTTLING TO FACILITATE OPERATION OF A CONTROL UNIT

BACKGROUND

A network device may process information packets received from a number of other devices. For example, a network switch or router can receive streams of information packets from other devices via a network. Moreover, the network device may process information packets using a shared resource, such as a main information packet pipeline. In this case, information packets received from a number of other devices may be combined into a single stream to be provided to the shared resource.

By way of example, FIG. 1 is a block diagram of a known arbitration system 100 that may be used in a network device to create a combined stream of information packets. In particular, an arbitration unit 110 receives information packets from a number of Media Access Control (MAC) modules 120 (e.g., each MAC module 120 may be associated with a port through which a network device receives information packets). The arbitration unit 110 combines the received information packets into a single stream that is transmitted to a main pipeline (e.g., for further processing by the network device).

A network device is typically designed to support a predetermined level of performance. For example, a network device might be designed to process approximately 70 million information packets each second. Therefore, a network device that executes 210 million processing cycles each second (MHz) must process each information packet within three processing cycles (i.e., 210/70 = 3). Similarly, if the network device instead operates at 280 MHz it can spend four processing cycles on each packet. Note that a network device may be pipelined (e.g., different stages in the network device simultaneously operate on different packets), and the processing time per packet described herein may refer to the number of processing cycles that can be used during each stage.

In addition to processing information packets, other functions associated with the network device may need to be performed. For example, a control unit associated with the network device may need to perform a bookkeeping task, such as by setting up tables and/or registers. Similarly, programming, address insertion, and/or learning tasks may need to be performed. To accommodate the performance of these functions, a network device is usually designed to be able to execute processing cycles faster than are required solely for information packet processing. Using the previous example, a network device that can process 70 million packets each second (and processes each packet within three processing cycles) might be designed to operate at 245 MHz. In this case, the network device can use 210 MHz to process information packets and the remaining 35 MHz to perform other functions. That is, processing cycles will intermittently become available (e.g., meaning that no information packet currently needs to processed). These available processing cycles can then be used by, for example, the control unit.

The amount of processing cycles that become available will, on average, correspond to the excess capacity of the network device (e.g., the ability of the network device to execute processing cycles in excess of those needed to process information packets). For example, in the above example, one out of seven processing cycles can be expected, on average, to become available to perform other functions. Although the average amount of available processing cycles can be determined, the actual amount that will become available during a given period of time can vary. For example, the MAC modules 120 might buffer information packets before providing them to the arbitration unit 110. In this case, all processing cycles could be needed to process a burst of information packets in a given period of time, and therefore no processing cycles will be available to perform other functions. As a result, the performance of the network device may be degraded (e.g., bottlenecks may occur and/or other tasks may not be performed during that time).

DETAILED DESCRIPTION

Some embodiments described herein are associated with "network" devices. As used herein, the term "network" may refer to, for example, a number of interconnected hardware devices and associated software through which information packets may be exchanged. For example, information packets may be exchanged in accordance with the Fast Ethernet Local Area Network (LAN) transmission standard 802.3-2002® published by the Institute of Electrical and Electronics Engineers (IEEE). Examples of network devices include network switches and routers.

Throttling Unit

Figure 1:
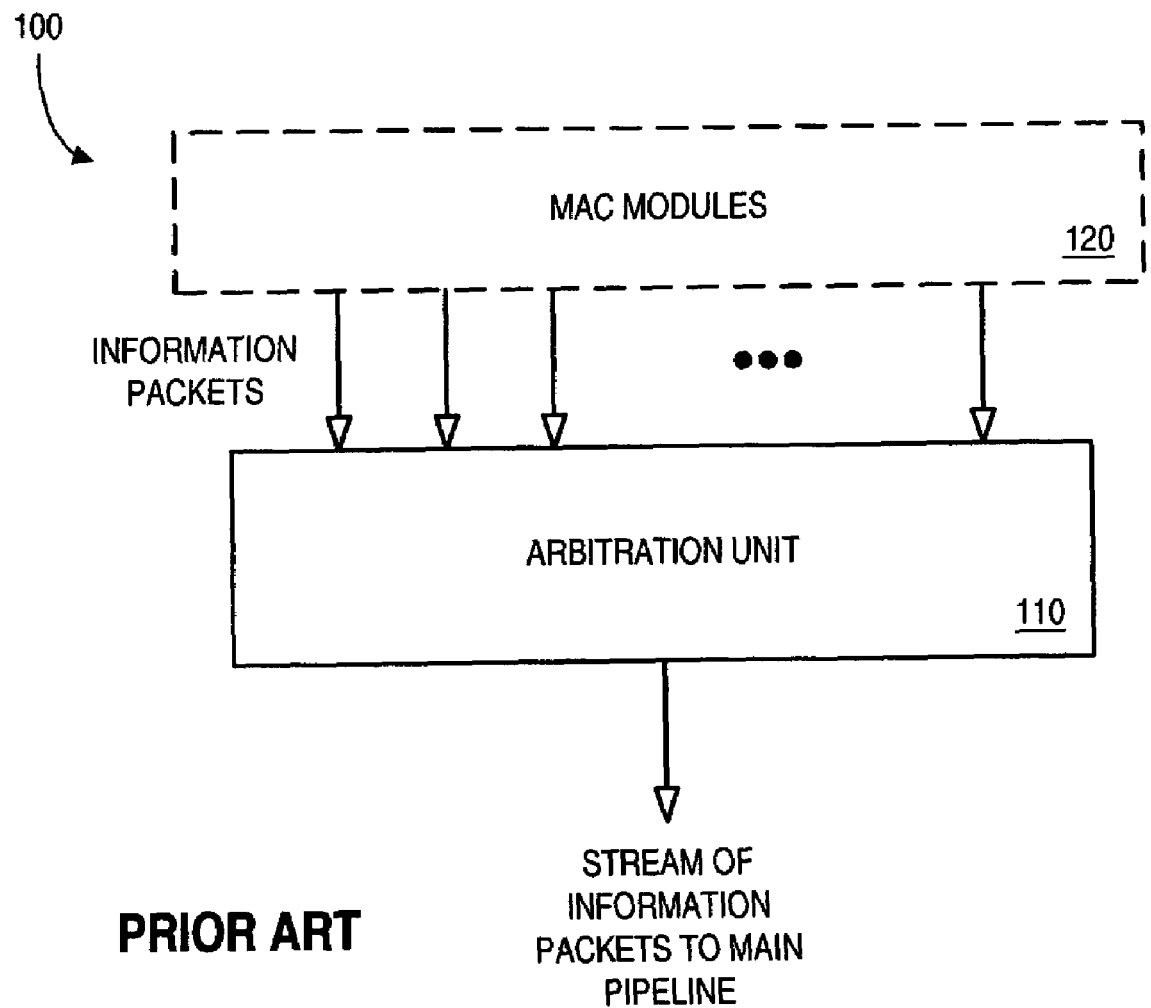
FIG. 1 is a block diagram of a known arbitration system.
Figure 2:
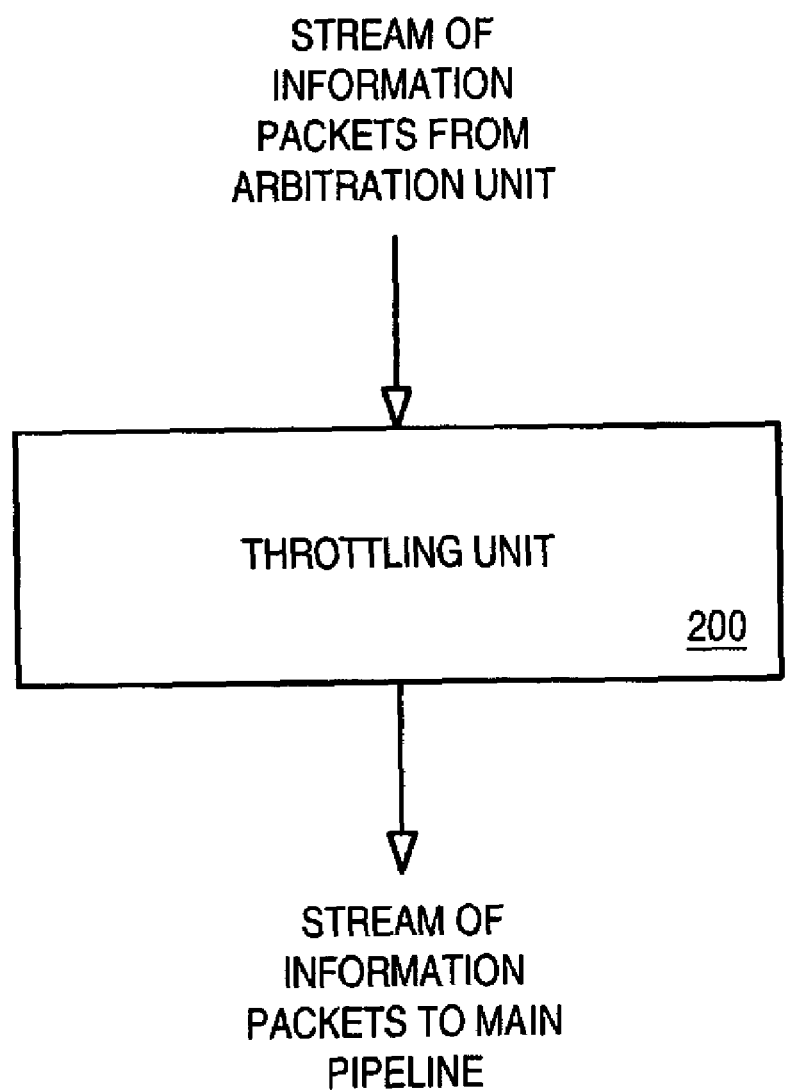
FIG. 2 is a block diagram of a throttling unit according to some embodiments.

FIG. 2 is a block diagram of a throttling unit 200 according to some embodiments. The throttling unit 200 receives a stream of information packets via an input port (e.g., from an arbitration unit) and transmits a stream of information packets via an output port (e.g., to a main processing pipeline).

According to some embodiments, the throttling unit 200 facilitates the performance of functions other than information packet processing (i.e., the operation of a control unit). Note that a control unit may comprise, for example, any internal or external unit associated with bookkeeping, (e.g., register or table set up), programming, address insertion, and/or learning tasks.

For example, the throttling unit 200 may periodically insert a spare processing cycle in the transmitted stream of information packets. The spare processing cycle may then be used to perform functions other than information packet processing.

Figure 3:
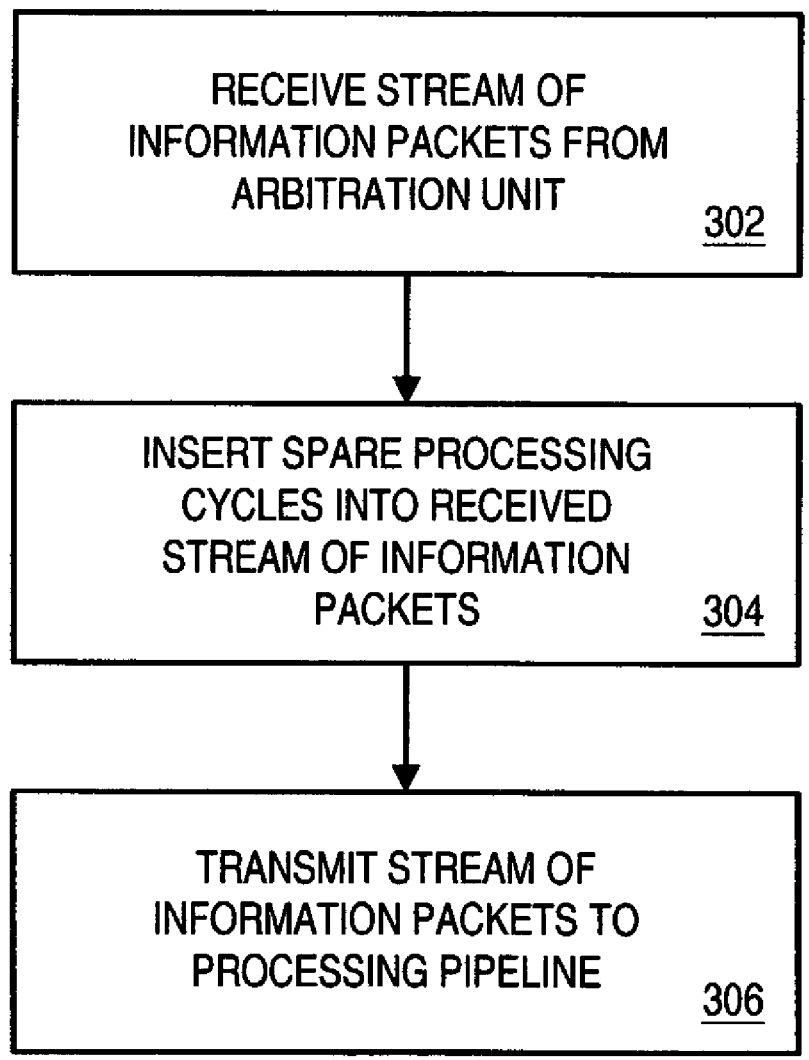
FIG. 3 is a flow chart of a method according to some embodiments.

FIG. 3 is a flow chart of a method according to some embodiments. The flow charts described herein do not imply a fixed order to the actions, and embodiments may be practiced in any order that is practicable. The method may be associated with, for example, the throttling unit 200 illustrated in FIG. 2.

At 302, a stream of information packets is received. For example, the throttling unit 200 may receive a stream of information packets from an arbitration unit.

At 304, one or more spare processing cycles are inserted into the received stream of information packets. For example, the throttling unit 200 may insert a spare processing cycle after a pre-determined number of information packets have been processed (i.e., received or transmitted).

Figure 4:
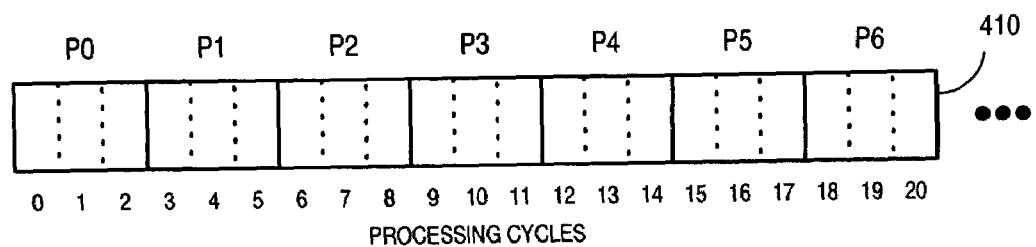
FIG. 4 illustrates streams of information packets according to some embodiments.
Figure 4:
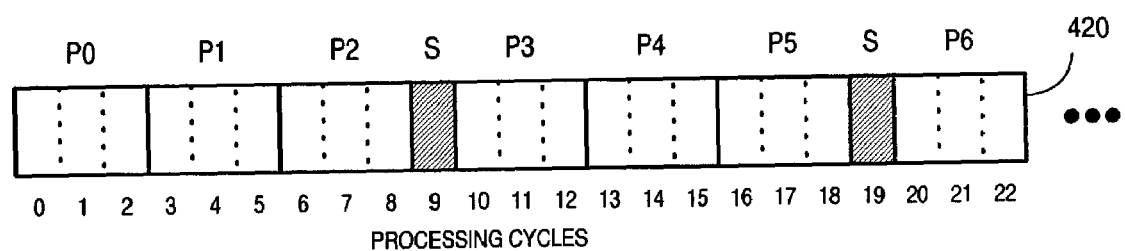

FIG. 4 illustrates a received stream of information packets 410 and an associated transmitted stream of information packets 420. In this case, each information packet (P0 through P6) is associated with three processing cycles (e.g., P0 is associated with processing cycles 0 through 2). As can be seen, a spare processing cycle (S, represented by cross-hatching in FIG. 4) is inserted after every three information packets (e.g., after P2 and P5).

At 306, the stream of information packets, including the spare processing cycles, is transmitted. For example, the throttling unit 200 may transmit the stream of information packets to a main processing pipeline. The spare processing cycles that were inserted may then be used, for example, by a control unit to perform other functions (e.g., because no information packet will need to be processed).

Throttling Example

Figure 5:
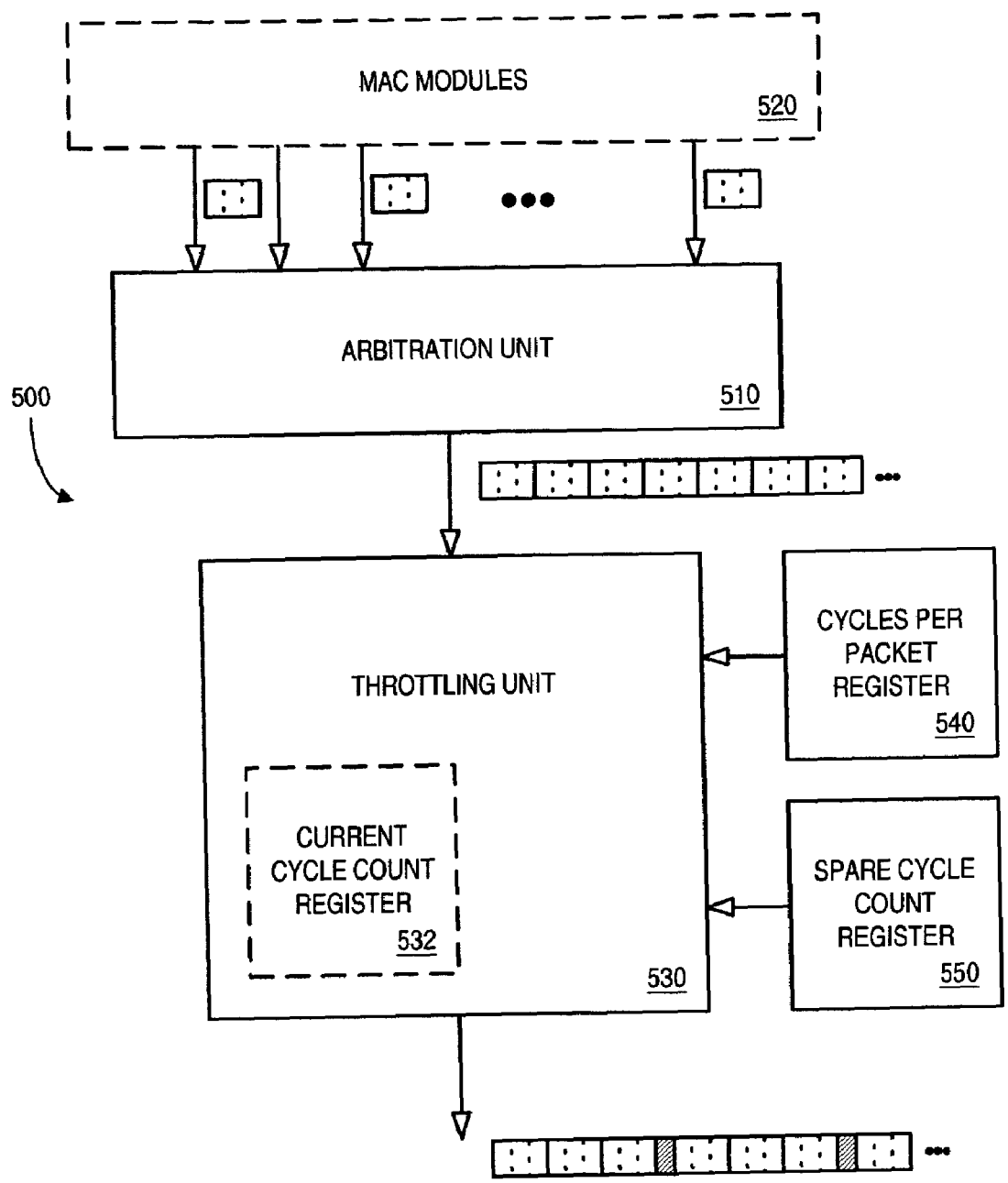
FIG. 5 is a block diagram of a system according to some embodiments.

FIG. 5 is a block diagram of a system 500 according to some embodiments. The system 500 may be associated with, for example, a packet network, a Local Area Network (LAN), an Ethernet network, a switch, and/or a router. Moreover, some or all of the system 500 may be provided in an Application Specific Integrated Circuit (ASIC) environment.

The system includes an arbitration unit 510 that receives information packets from a number of MAC modules 520. The information packets may comprise, for example, Ethernet packets to be exchanged via a network.

Based on the received information packets, the arbitration unit 510 provides a stream of information packets to a throttling unit 530. Note that the arbitration unit 510 may select information packets in accordance with any of a number of techniques, such as a round robin arbitration scheme.

The throttling unit 530 may include an internal current cycle count register 532 and may also receive information from a cycles per packet register 540. The cycles per packet register 540 may comprise, for example, a control register that stores a value indicating a number of processing cycles that are required to process each information packet.

The throttling unit 530 may also receive information from a spare cycle count register 550. The spare cycle count register 550 may comprise, for example, a control register that stores a value indicating how often a spare processing cycle should be inserted into an information stream. As used herein, a "control" register may comprise, for example, a register that can be programmed. According to some embodiments, the cycles per packet and spare cycle count control registers let an appropriate amount of spare processing cycles be inserted (e.g., via programming based on an actual clock frequency).

Figure 6:
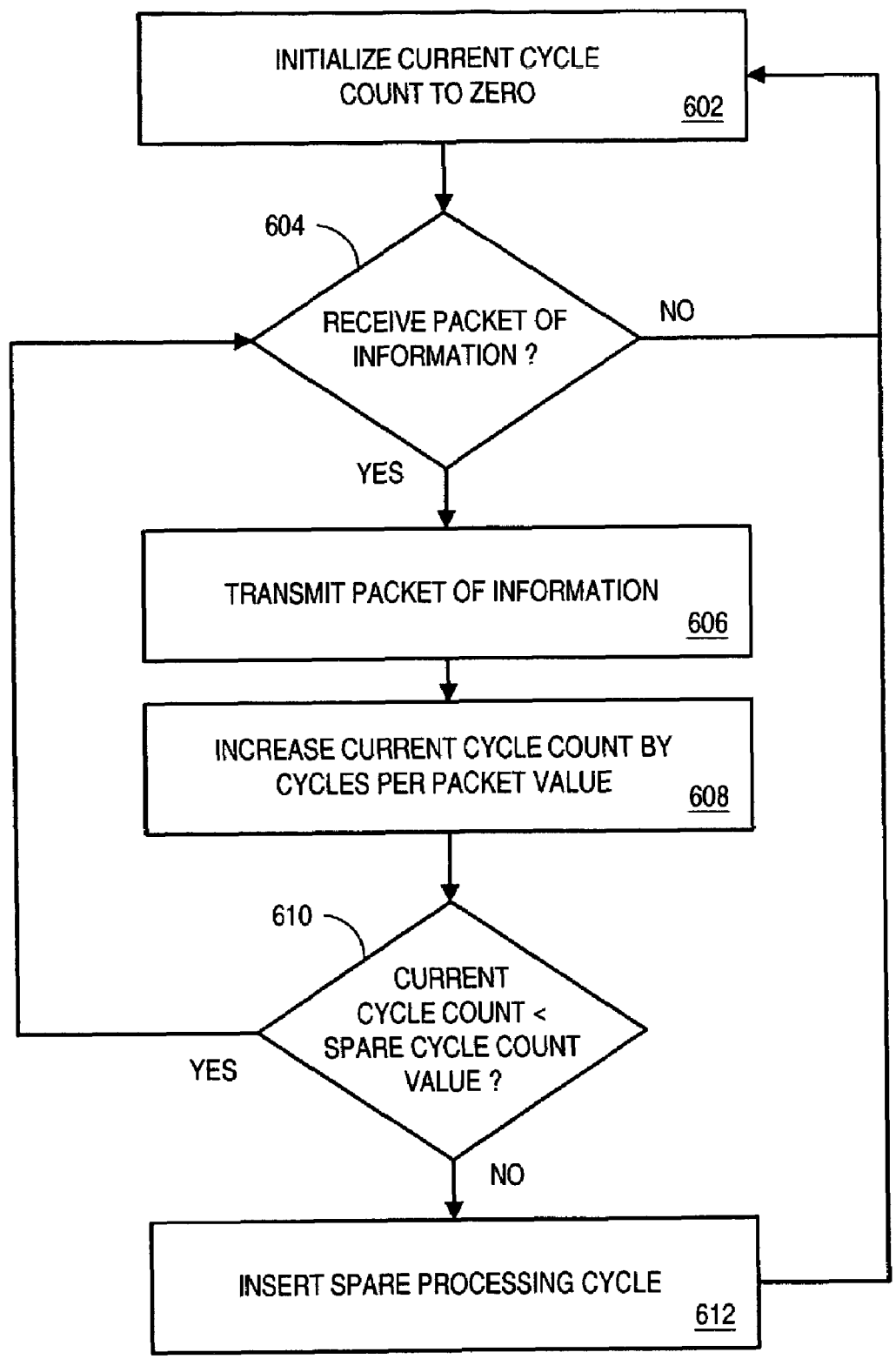
FIG. 6 is a flow chart of a method that may be performed by a throttling unit according to some embodiments.

FIG. 6 is a flow chart of a method that may be performed by the throttling unit 530 according to some embodiments. At 602, the current cycle count is initialized. For example, the throttling unit 530 may initialize the current cycle count register 532 with a zero value. Note that the cycles per packet register 540 and the spare cycle count register 550 may also have been initialized (e.g., to appropriate values that have been programmed).

If no packet of information is received at 604, the process continues at 602 (i.e., the current cycle count remains zero). If a packet of information is received at 604, the process continues at 606. For example, the throttling unit 530 may receive the packet of information from the arbitration unit 510 (e.g., which in turn may have received the packet from another network device via a MAC module 520).

The packet of information is then transmitted at 606. For example, the throttling unit 530 may transmit the packet of information to a main processing pipeline (e.g., so that information can ultimately by provided to an appropriate network device).

At 608, the current cycle count is increased by the value stored in the cycles per packet register 540. For example, the current cycle count may be incremented by three (e.g., assuming that each information packet is processed in three cycles).

If the current cycle count is less than the value stored in the spare cycle count register 550 at 610, the process continues at 604 (e.g., the next packet of information may be received and transmitted).

If the current cycle count is not less than the value stored in the spare cycle count register 550 at 610, a spare processing cycle is inserted into the transmitted stream of information packets. The process then continues at 602 (e.g., the current cycle count is re-initialized to zero and the next packet of information may be received). The inserted spare processing cycle may be used, for example, by a control unit to perform other functions.

Note that, according to some embodiments, the current cycle count is instead initialized at 602 to a value equal to the spare cycle count value. In such an embodiment, the current cycle count is decremented at 608 (and a zero or negative current cycle count would result in a spare processing cycle being inserted).

Consider again a network device that can handle 70 million packets each second, processes each packet within three processing cycles, and operates at 245 MHz. In this case, the cycles per packet register 540 may be initialized to three and the spare cycle count register 550 may be initialized to six. In accordance with the process illustrated in FIG. 6, a spare processing cycle will be inserted after every other information packet. That is, six processing cycles are used to process information packets and then one processing cycle is used to perform other functions. Note that the processing cycles provided for performing other functions is deterministic (e.g., a control unit would not need to wait more than six processing cycles before receiving an available processing cycle). As other examples, Table I illustrates various clock frequencies and appropriate register values for such a network device.

TABLE I

Clock Frequencies and Appropriate Values

| Clock Frequency | Spare Cycles | Spare Packets | Cycles Per Packet Register Value | Spare Cycle Count Register Value |
|---|---|---|---|---|
| 210 MHz | none | none | 3 | n/a |
| 218 MHz | 1/13 | after 4 packets | 3 | 12 |
| 234 MHz | 1/10 | after 3 packets | 3 | 9 |
| 245 MHz | 1/7 | after 2 packets | 3 | 6 |
| 280 MHz | 1/4 | after 1 packets | 3 | 3 |

Because processing cycles become available in deterministic fashion (instead of merely as a statistical average), the number of processing cycles that a control unit might have to wait is limited to a pre-determined maximum value. As a result, the performance of a network device may be improved (e.g., bottlenecks may avoided).

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

In some embodiments described herein, a spare processing cycle is inserted based on a number of processing cycles (e.g., as calculated based on the number of information packets that have been transmitted). According to another embodiment, a spare processing cycle is instead inserted based directly on the number of information packets that have been processed (e.g., instead of processing cycles). For example, the cycles per packet register 540 may be eliminated, the spare cycle count register 550 may be replaced with a spare packet count register, and the current cycle count register 5332 may be replaced with a current packet count register. According to still other embodiments, spare processing cycles are inserted based on time (e.g., in a periodic, synchronous, and/or isochronous fashion) or in response to an external request (e.g., from an internal or external control unit).

Moreover, in some embodiments described herein a single spare processing cycle is inserted (e.g., after six processing cycles have been used for information packets). According to other embodiments, any other number of spare processing cycles can be inserted (e.g., two spare processing cycles may be inserted after twelve processing cycles have been used for information packets).

In addition, in some embodiments described herein separate arbitration and throttling units are provided. According to other embodiments, the functions of the throttling unit may be incorporated in the arbitration unit (e.g., along with round robin arbitration or sequential priority encoding schemes).

Further, although software or hardware are described as performing certain functions, such functions may be performed using software, hardware, or a combination of software and hardware (e.g., a medium may store instructions adapted to be executed by a processor to perform a method of facilitating operation of a control unit). For example, functions described herein may be implemented via a software simulation of ASIC hardware.

The several embodiments described herein are solely for the purpose of illustration. Persons skilled in the art will recognize from this description other embodiments may be practiced with modifications and alterations limited only by the claims.

What is claimed is:

1. An apparatus, comprising:
   an input port to receive a stream of information packets;
   an output port to transmit a stream of information packets; and
   a throttling unit to insert a spare processing cycle in the transmitted stream of information packets, wherein the spare processing cycle is inserted after each pre-determined number of information packets;
   a cycle per packet register to store a value indicating a number of processing cycles associated with each information packet;
   a current cycle count register; and
   a spare cycle count register.

2. The apparatus of claim 1, wherein the spare processing cycle facilitates operation of a control unit.

3. The apparatus of claim 2, wherein the operation of the control unit is associated with at least one of: (i) a bookkeeping task, (ii) a register set up task, (iii) a table set up task, (iv) a programming task, (v) an address insertion task, and (vi) a learning task.

4. The apparatus of claim 1, wherein the input port receives the stream of information packets from an arbitration unit.

5. The apparatus of claim 4, wherein the information packets in the received stream are associated with at least one media access control module.

6. The apparatus of claim 1, wherein the stream of information packets is transmitted via a processing pipeline.

7. The apparatus of claim 1, wherein said throttling unit is to:
   initialize the current cycle count register;
   increment the current cycle count register by the value stored in the cycles per packet register each time an information packet is processed; and
   insert the spare processing cycle based on the values stored in the current cycle count register and the spare cycle count register.

8. The apparatus of claim 7, wherein the spare processing cycle is inserted when the value in the current cycle count register is not less than the value in the spare cycle count register.

9. The apparatus of claim 1, wherein said cycles per packet register and said spare cycle count register comprise control registers and said current cycle count register comprises an internal register.

10. The apparatus of claim 1, wherein the apparatus is associated with at least one of: (i) a packet network, (ii) a local area network, (iii) an Ethernet network, (iv) a switch, and (v) a router.

11. The apparatus of claim 1, wherein the apparatus is associated with an application specific integrated circuit.

12. A network device comprising:
    a arbitration unit to receive information packet from a number of media access control modules; and
    a throttling unit to receive a stream of information packets from the arbitration unit and to transmit a stream of information packets to a processing pipeline, wherein the throttling unit facilitates operation of a control unit, wherein said throttling unit facilitates operation of the control unit by inserting spare processing cycles in the transmitted stream of information packets, wherein said throttling unit is further associated with:
    a cycles per packet control register to store a value indicating a number of processing cycles required to transmit each information packet,
    an internal current cycle count register, and
    a spare cycle count control register, and said throttling unit is to:
       initialize the internal current cycle count register;
       increment the internal current cycle count register by the value stored in the cycles per packet control register each time an information packet is processed; and
       insert the spare processing cycle based on the values stored in the internal current cycle count register and the spare cycle count control register.

* * * * *